US012530228B2

(12) United States Patent
Devlin et al.

(10) Patent No.: US 12,530,228 B2
(45) Date of Patent: Jan. 20, 2026

(54) FACILITATING DISTRIBUTED JOB EXECUTION

(71) Applicant: Capital One Services, LLC, McLean, VA (US)

(72) Inventors: Jason Devlin, Allen, TX (US); Kshitij Koushik, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 514 days.

(21) Appl. No.: 18/175,500

(22) Filed: Feb. 27, 2023

(65) Prior Publication Data

US 2024/0289178 A1 Aug. 29, 2024

(51) Int. Cl.

*G06F 9/48* (2006.01)
*G06F 9/50* (2006.01)
*G06F 9/52* (2006.01)

(52) U.S. Cl.

CPC .......... *G06F 9/4881* (2013.01); *G06F 9/5055* (2013.01); *G06F 9/5077* (2013.01); *G06F 9/52* (2013.01); *G06F 9/522* (2013.01); *G06F 9/526* (2013.01)

(58) Field of Classification Search

None

See application file for complete search history.

(56) References Cited

PUBLICATIONS

Manna, "Solving multiple executions of @Scheduled tasks across multiple nodes even with ShedLock—Spring Boot", Sep. 12, 2022, Medium. (Year: 2022).*
"Lock @Scheduled Task with ShedLock and Spring Boot", Jan. 12, 2021, Spring Framework Tutorials (Year: 2021).*
"Spring ShedLock Guide", Jul. 25, 2022. (Year: 2022).*
Krecan, "ShedLock: Distributed lock for your scheduled tasks", May 14, 2019, GitHub. (Year: 2019).*

* cited by examiner

*Primary Examiner* — Qing Yuan Wu
(74) *Attorney, Agent, or Firm* — Foley & Lardner LLP

(57) ABSTRACT

Methods and systems are described herein for facilitating distributed job execution without a central job scheduler. The system may cause a container to, prior to executing job execution code for a job associated with a job data record, update a record instance of the job data record to indicate an updated status for the job and attempt to update the job data record at a database based on the record instance of the job data record. If the container successfully updates the job data record, the container may execute the job execution code for the job. If the container fails to update the job data record, the container may refrain from executing the job execution code for the job. The system may then update a first job data record associated with a first job at the database based on execution of the first job by a first container.

20 Claims, 7 Drawing Sheets

300

303 306

| Job Data Record | Status |
|---|---|
| <job_data_record_1> | JIP |
| <job_data_record_2> | FAIL |
| <job_data_record_3> | CRT |
| <job_data_record_4> | CMP |
| <job_data_record_5> | RTRY |

| Job Data Record | Status |
| --- | --- |
| <job_data_record_3> | CMP |

450

453 456

| Job Data Record | Status |
| --- | --- |
| <job_data_record_3> | FAIL |

| *Job Data Record* | *Status* | *Attempts* |
|---|---|---|
| *<job_data_record_5>* | *RTRY* | *2* |

FIG. 5

FACILITATING DISTRIBUTED JOB EXECUTION

BACKGROUND

Processing large quantities of data requires massive computational resources and extensive time. Conventional processing of this data can interfere with other processes requiring these resources and may be unable to keep up with the demands of the system. Initial attempts to solve this problem utilize distributed job execution. Distributed job execution enables multiple containers to process data jobs simultaneously. Jobs may be gathered over a period and processed as a batch at a later time, such as when more computing resources are available (e.g., overnight). Distributed job execution systems typically require a central scheduler, which assigns jobs to specific containers and schedules those jobs for execution. During operation, the central schedule directly handles various aspects of job scheduling and execution, including job status updating. The central scheduler, in addition to utilizing considerable resources, may be a single point of failure, which jeopardizes execution of a multitude of jobs. However, without the central scheduler, distributed job execution systems face several technical challenges. For example, a distributed job execution system without a central scheduler may be unable to ensure that data between jobs is nonoverlapping and that job processing is not duplicated. These technical drawbacks waste computational resources. Thus, a mechanism is desired for facilitating distributed job execution and tracking without a central scheduler.

SUMMARY

Methods and systems are described herein for facilitating distributed job execution without a central scheduler. A distributed job execution system may be built and configured to perform operations discussed herein. The distributed job execution system may generate and store, in a database, job data records associated with data jobs. For example, the jobs may be generated based on nonoverlapping time periods such that the data in each job does not overlap the data in any other job. In some embodiments, each job data record may indicate a status of a given job to be processed. The distributed job execution system may cause each container of a plurality of distributed containers to perform a number of operations. For example, each distributed container (or each of its threads) may act as a distributed scheduler. Prior to executing the job execution code for a job associated with a particular job data record, the container may update a record instance of the job data record to indicate an updated status for the job and attempt to update the job data record at the database based on the record instance of the job data record. By performing these operations prior to executing a job execution code for the job, the system avoids reprocessing a job that has already been processed by another container (e.g., avoiding double processing while not having a central scheduler). If the container successfully updates the job data record at the database, the container may determine that the particular job has not been taken by another container and may execute the job execution code for the job. In addition, this action updates the database to indicate that the job has now been taken by the particular container. If the container fails to update the job data record at the database, the container may refrain from executing the job execution code for the job. Thus, the execution of the code is contingent upon a determination that the job has not already been processed (e.g., that the job has not been claimed by another container). Accordingly, the database system may include a mechanism that locks the job record when it is claimed by a particular container. Finally, the distributed job execution system may update a job data record associated with a job at the database based on execution of the job by the container. In some embodiments, only the container that claimed the job may be able to update the job record within the database.

In particular, the distributed job execution system may generate and store job data records associated with data jobs in a database. For example, the distributed job execution system may generate and store job data records for each hour of the previous 24 hours. Thus, each job data record may be nonoverlapping with any other job data record. Each data record of the job data records may indicate a status of a given job associated with the data record to be processed. The status may indicate the availability of a given job associated with the data record to be processed. For example, statuses may include "created," "job in progress," "completed," "failed," "retry," or other statuses indicating availability. The distributed job execution system may release the jobs to distributed containers by enabling the distributed containers to access the job data records.

The distributed job execution system may deploy preliminary execution code that causes a container to perform certain actions. Prior to beginning execution of job execution code for a job associated with a job data record of the job data records, the container may be caused to update the status data field of a record instance of the job data record to have a job-in-progress status. For example, the container may update the job data record locally to reflect that processing of the job is in progress. Also prior to beginning execution of job execution code for the job, the container may be caused to attempt to update the job data record at the database by attempting to synchronize the record instance of the job data record to the database. The container may thus attempt to synchronize the updated local status (i.e., "job in progress") with a status associated with the job at the database. In some embodiments, the synchronization may only succeed if the status at the database is able to be updated to "job in progress." For example, if the status is "created," the update to "job in progress" may be performed, and the synchronization may succeed. If the status is already "job in progress" at the database, the update cannot be performed and the synchronization may fail.

In response to the container successfully synchronizing the record instance of the job data record to the database, the container may be caused to execute the job execution code for the job associated with the job data record. In some embodiments, the successful synchronization at the database may indicate to the container that the job is available for processing. Based on the successful synchronization, the container may proceed to process the job. Furthermore, the synchronization of the "job in progress" status with the database may indicate to other containers that the job is no longer available. This update may cause other containers to move on to attempting to process other jobs without wasting computational resources on the job that was already claimed. In response to the container failing to synchronize the record instance of the job data record to the database, the container may be caused to refrain from executing the job execution code for the job associated with the job data record. The failure to synchronize the status at the database may indicate to the container that the job is unavailable for processing. The container thus may not proceed to process the job. Instead, the container (e.g., computing code associated with the container) may move on to attempt to process another job without wasting further computational resources.

In response to a given container of the distributed containers completing the execution of the job execution code for the job, the distributed job execution system may update the job data record at the database by synchronizing an updated record instance of the job data record to the database. For example, the updated record instance may be updated by the given container to include a job completed status for the status data field of the job data record. The job completed status may be synchronized with the database to indicate to other containers that the job has been completed. The completed status, like the job-in-progress status, indicates to other containers that the job is unavailable for processing.

In some embodiments, a given container may fail to execute the job execution code for the job. For example, the container may successfully synchronize a job-in-progress status with the database but may then determine that the job execution code failed to execute for the job associated with the job data record. The container may then update the job data record at the database again by synchronizing an updated record instance of the job data record to the database. In some embodiments, the update may include a job failed status for the status data field of the job data record. In some embodiments, the update may include a retry status for the status data field of the job data record. A job with a retry status may indicate to the container or other containers that containers may attempt to process the job again up to a maximum number of attempts. For example, in response to determining that the maximum number of attempts has not been reached, a container may update the status data field of the record instance of the job data record from the retry status to the job-in-progress status and attempt to synchronize the record instance of the job data record to the database. Containers may continue to attempt to process the job until the maximum number of attempts has been reached.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3. illustrates a data structure storing job data record statuses, in accordance with one or more embodiments.

FIG. 4 illustrates data structures storing updated job data record statuses, in accordance with one or more embodiments.

FIG. 5 illustrates a data structure storing job data record retry attempts, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
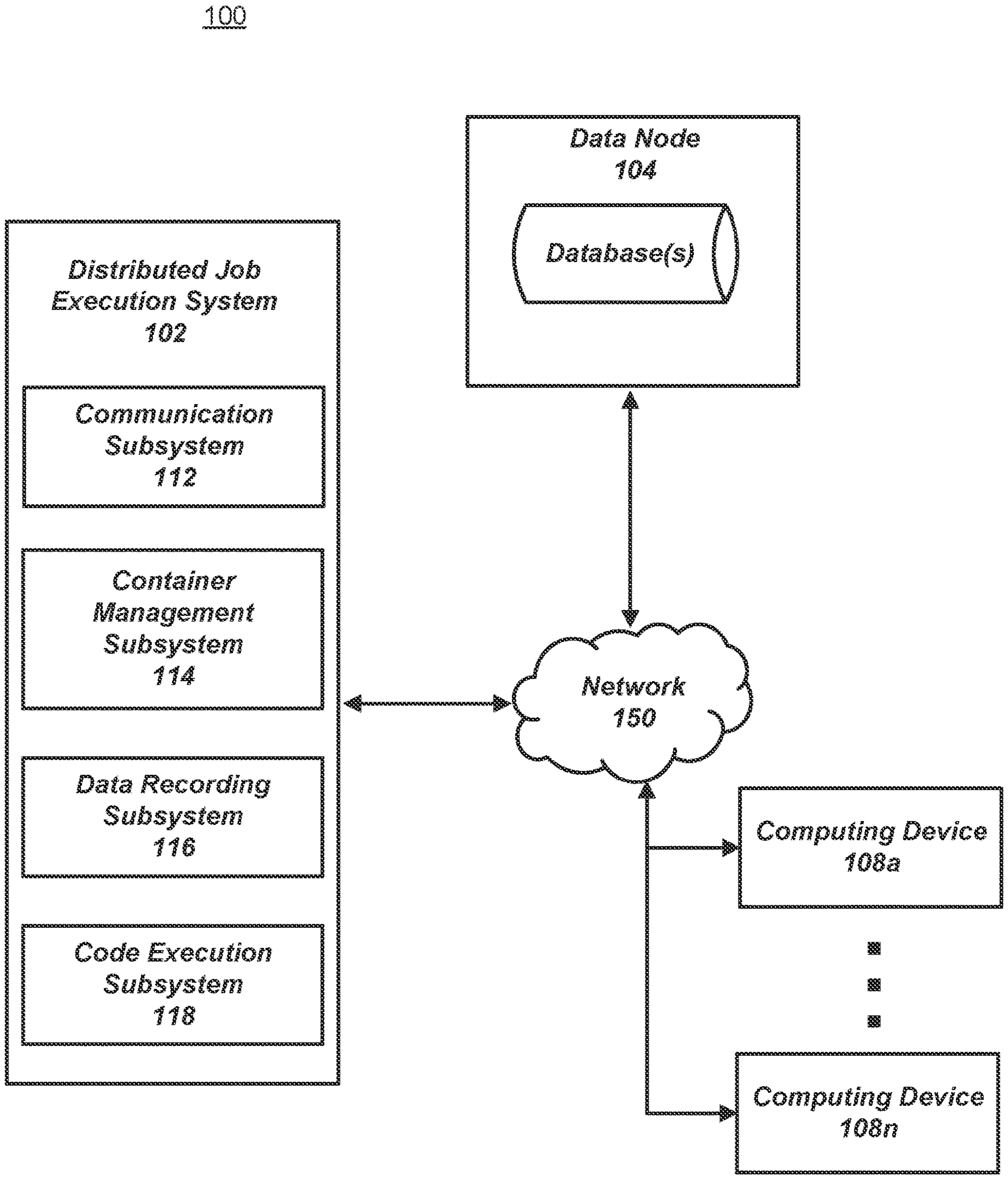
FIG. 1 shows an illustrative system for facilitating distributed job execution without a central job scheduler, in accordance with one or more embodiments.

FIG. 1 shows an illustrative system 100 for facilitating distributed job execution without a central job scheduler, in accordance with one or more embodiments. System 100 includes distributed job execution system 102, data node 104, and computing devices ***108a*-*108n*. In some embodiments, computing devices *108a*-*108n* may be remote computing devices that may receive and send data via network 150. Each computing device 108 may include any type of mobile terminal, fixed terminal, or other device. By way of example, computing device 108 may include a desktop computer, a notebook computer, a tablet computer, a smartphone, a wearable device, or other client device. It should be noted that, while one or more operations are described herein as being performed by particular components of distributed job execution system 102, those operations may, in some embodiments, be performed by other components of distributed job execution system 102 or other components of system 100. As an example, while one or more operations are described herein as being performed by components of distributed job execution system 102, those operations may, in some embodiments, be performed by components of computing devices *108a*-*108n***.

Distributed job execution system 102 may execute instructions for distributing job execution without a central job scheduler. Distributed job execution system 102 may include software, hardware, or a combination of the two. For example, distributed job execution system 102 may be a physical server or a virtual server that is running on a physical computer system. In some embodiments, distributed job execution system 102 may be configured on a user device (e.g., a laptop computer, a smart phone, a desktop computer, an electronic tablet, or another suitable user device).

Data node 104 may store various data, including access tokens, account information, resource class information, resource information, requests, aggregated resource data, resource usage metrics, and/or other suitable data. Data node 104 may include software, hardware, or a combination of the two. For example, data node 104 may be a physical server, or a virtual server that is running on a physical computer system. In some embodiments, distributed job execution system 102 and data node 104 may reside on the same hardware and/or the same virtual server/computing device. Network 150 may be a local area network, a wide area network (e.g., the Internet), or a combination of the two.

In some embodiments, distributed job execution system 102 (e.g., data recording subsystem 116) may generate and store, in a database, a plurality of job data records associated with jobs. In some embodiments, distributed job execution system 102 may include a batch processing system. Batch processing may involve methods of processing jobs that can run without end user interaction or can be scheduled to run at certain times when resources are available. For example, distributed job execution system 102 may receive requests throughout a 24 hour period. Distributed job execution system 102 may process the requests overnight each night, when more resources are available. In some embodiments, distributed job execution system 102 may process the data records at midnight each night for data received during the previous 24 hours. As an example, distributed job execution system 102 may receive alerts for account holders affiliated with an organization who have late payments. Distributed job execution system 102 may receive requests associated with the alerts over 24 hours and may process the data at midnight each night in order to generate letters to each account holder having a late payment. In some embodiments, distributed job execution system 102 may generate the job data records based on information received by communication subsystem 112. In some embodiments, data recording subsystem 116 may store the job data records in data node 104.

In some embodiments, each data record of the job data records may comprise a status data field indicating availability of a given job associated with the data record to be processed. For example, statuses may include "created," "job in progress," "completed," "failed," "retry," or other statuses indicating availability. A "created" status may indicate that the associated job data record is available for processing by a container. A "job-in-progress" status may indicate that the associated job data record is unavailable for processing, as it is currently being processed by another container. A "completed" status may indicate that the associated job data record is unavailable for processing, as it has already been processed. A "failed" status may indicate that the associated job data record is unavailable for processing, as processing has already failed, while a "retry" status may indicate that processing of the associated job data record failed but is available for another attempt at processing.

In some embodiments, the data associated with each job may be nonoverlapping with respect to data associated with other jobs. For example, each job may be generated based on a specific time chunk. A time chunk may be a certain portion of a time period over which data has been gathered for processing. For example, a system that is processing data received during the previous 24 hours may divide the data into 24 time chunks. A job may therefore entail all data received during a particular time chunk (e.g., 1:00:00 AM EST through 1:59:59 AM EST). In some embodiments, the data may be divided according to other time chunks (e.g., seconds, minutes, hours, days, weeks, etc.). In some embodiments, the data may be divided according to a different scheme for generating jobs with nonoverlapping data.

Distributed job execution system 102 (e.g., container management subsystem 114) may release the jobs to a plurality of distributed containers by enabling the distributed containers to access the job data records. In some embodiments, container management subsystem 114 releases the jobs to one or more threads of the plurality of distributed containers. A data container is a data structure that stores and organizes virtual objects. A virtual object is a self-contained entity that consists of both data and procedures to manipulate the data. Container management subsystem 114 may provision one or more containers and clusters for executing the jobs on the system infrastructure. Container management subsystem 114 may facilitate the deployment, scaling, and management of containerized applications. Container management subsystem 114 may be configured to automate the assignment and management of scheduled jobs and applications. Container management subsystem 114 may assign jobs to the physical/virtual machines affiliated with distributed job execution system 102. To this end, container management subsystem 114 determines available virtual/physical machines and automatically assigns a scheduled job or application to a virtual/physical machine. In addition, container management subsystem 114 may manage job deployments and scale the underlying compute group based on demand. In some embodiments, distributed job execution system 102 may create containers and launch such containers on the physical/virtual machines in a compute group. Distributed job execution system 102 may launch containers on the underlying machines in a manner that distributes the load evenly among the active machines. In some embodiments, each distributed container (or each of its threads) may act as a distributed scheduler for job processing in a distributed environment without a central scheduler.

Code execution subsystem 118 may deploy preliminary execution code configured to cause a container of the distributed containers to perform a number of actions. In some embodiments, the code may cause containers to claim jobs for processing, process jobs, update job data records locally and at a database, and perform other jobs. In some embodiments, the preliminary execution code may be stored in data node 104 and may be sent to the containers. In some embodiments, the preliminary execution code may be stored within the containers.

Figure 2:
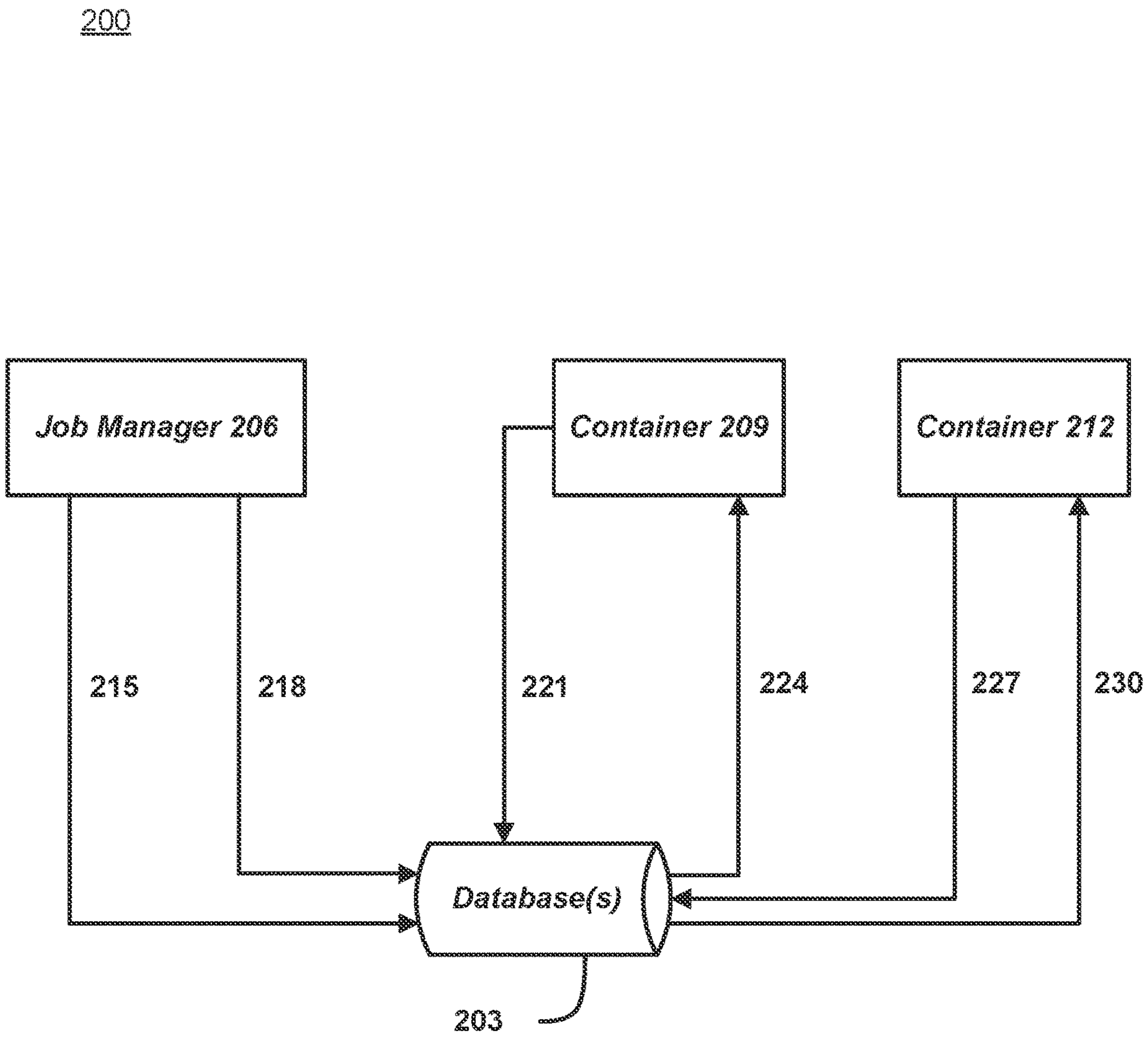
FIG. 2 shows an illustrative system for distributed job execution, in accordance with one or more embodiments.

FIG. 2 shows an illustrative system 200 for distributed job execution, in accordance with one or more embodiments. System 200 may include a job manager 206. In some embodiments job manager 206 may include container management subsystem 114, data recording subsystem 116, code execution subsystem 118, or other subsystems of FIG. 1. In some embodiments job manager 206 may be associated with container management subsystem 114, data recording subsystem 116, code execution subsystem 118, or other subsystems of FIG. 1. In some embodiments, system 200 may also include one or more containers, such as container 209 and container 212. In some embodiments, job manager 206, container 209, and container 212 may each be enabled to update database 203. In some embodiments, job manager 206 may generate a plurality of job data records associated with jobs. At step 215, job manager 206 may store the plurality of job data records at database 203. Job manager 206 may then enable container 209 and container 212 to access the job data records.

Returning to FIG. 1, prior to beginning execution of job execution code for a job associated with a job data record of the job data records, container management subsystem 114 (e.g., in conjunction with data recording subsystem 116) may cause the container to update the status data field of a record instance of the job data record to have a job-in-progress status. Container management subsystem 114 may then cause the container to attempt to update the job data record at the database by attempting to synchronize the record instance of the job data record to the database. In some embodiments, the container may attempt to synchronize the updated status data field of the data structure of the job data record with the database. In some embodiments, the container may attempt to synchronize the updated data structure of the job data record with the database. When the container attempts to synchronize the record instance of the job data record to the database, the synchronization may only be successful if the database includes a status for the job data record that indicates that the job data record is available (e.g., created or retry statuses). In some embodiments, if the database already includes a job-in-progress status for the job data record, or some other status that indicates unavailability of the job data record (e.g., failed or completed statuses), the synchronization may fail.

For example, container 209 may claim a first job data record associated with a first job at step 224. For example, claiming a first job data record may include updating a status associated with the first job data record, at database 203, to have a job-in-progress status. In some embodiments, container 212 may attempt to claim the first job. For example, container 212 may attempt to update the status associated with the first job data record, at database 203, to have a job-in-progress status. Because the first job was already claimed by container 209, the status data field associated with the first job data record at database 203 may already have a job-in-progress status. Since the job-in-progress status indicates that the first job has already been claimed, container 212 may move onto another job, such as a second job of the plurality of jobs. Container 212 may claim the second job at step 230. Claiming the second job data record may include updating, at database 203, a status associated with the second job data record to have a job-in-progress status.

FIG. 3 illustrates a data structure 300 storing job data record statuses, in accordance with one or more embodiments. Data structure 300 may be a subset of a larger data structure. In some embodiments, data structure 300 may be stored at the database (e.g., database 203, as shown in FIG. 2). Data structure 300 may include job data records 303 and statuses 306 associated with job data records 303. In some embodiments, statuses may include JIP (e.g., job in progress), FAIL (e.g., failed), CRT (e.g., created), CMP (e.g., completed), RTRY (e.g., retry), or other statuses. In some embodiments, when data recording subsystem 116 generates and stores the data records at the database, each job data record may have a CRT status. Statuses 306 may be updated by data recording subsystem 116, one or more containers, or another entity to have other statuses, such as JIP, FAIL, CMP, or RTRY. In some embodiments, statuses such as CRT and RTRY may indicate that the associated job data record is available for processing, while statuses such as JIP, FAIL, and CMP may indicate that the associated job data record is not available for processing.

In some embodiments, a container may fail to synchronize the record instance of a job data record to the database. For example, the database may include a job-in-progress, completed, failed, or other status that indicates unavailability of the job data record. The container's attempt to update the job data record at the database by attempting to synchronize the record instance of the job data record to the database therefore fails. In some embodiments, in response to the container failing to synchronize the record instance of the job data record to the database, container management subsystem 114 may cause the container to update the status data field of the record instance of the job data record to have a failed-to-synchronize status. The failed-to-synchronize status may indicate that the respective job data record is unavailable or that there may be a synchronization issue.

In response to the container failing to synchronize, code execution subsystem 118 may cause the container to refrain from executing the job execution code for the job associated with the job data record. In other words, the container cannot claim the job because it cannot update the status at the database. Therefore, the container is caused to move on to a new job, if additional jobs remain to be processed. Prior to beginning execution of the job execution code for a new job associated with a new job data record of the job data records, container management subsystem 114 may cause the container to update a new status data field of a new record instance of the new job data record to have the job-in-progress status and attempt to update the new job data record at the database by attempting to synchronize the new record instance of the new job data record to the database. The container will continue to attempt to update job data records at the database by attempting to synchronize a record instance of each job data record to the database until the synchronization succeeds.

In some embodiments, a container may successfully synchronize a record instance of a job data record to the database. For example, the container may successfully synchronize a record instance of the job data record to have a job-in-progress, or JIP, status at the database. In response, distributed job execution system 102 (e.g., code execution subsystem 118) may cause the container to execute the job execution code for the job associated with the job data record. The job execution code may cause the container to process the data included in the job associated with the job data record. Processing the data may involve, for example, recording data received with a late payment alert for a particular account and generating an output based on the alert (e.g., a push notification, a letter informing an account holder of the late payment, a command to deduct a late payment fee from the account, or another output). As an example, returning to FIG. 2, container 209 may successfully synchronize a record instance of the first job data record to have a job-in-progress status at database 203. In response, job manager 206 may cause the container to execute the job execution code for the job associated with the job data record.

In response to a given container of the distributed containers completing the execution of the job execution code for the job, data recording subsystem 116 may update the job data record at the database by synchronizing an updated record instance of the job data record to the database. For example, the updated record instance may be updated by the given container to include a job completed status for the status data field of the job data record. A job completed status associated with a job may indicate that processing of the job is complete. In the example of late payments, a job complete status may indicate that a given container has processed all late payment alerts that were received by communication subsystem 112 during the time chunk to which the job is assigned (e.g., 1:00:00 AM EST through 1:59:59 AM EST). In some embodiments, communication subsystem 112 may transmit an output based on the completed job (e.g., a letter informing an account holder of the late payment).

For example, returning to FIG. 2, container 209 completing the first job may include, at step 221, container 209 updating the status associated with the job data record, at database 203, to have a completed status. In some embodiments, if container 209 already completed the processing by the time container 212 attempts to update database 203, the status data field associated with the first job data record at database 203 may have a completed status. Container 212 may then proceed to a second job. If container 212 successfully processes the job, container 212 may complete the job processing. In some embodiments, completing the second job may include, at step 227, container 212 updating the status associated with the second job data record, at database 203, to have a completed status.

FIG. 4 illustrates data structure 400 and data structure 450 storing updated job data record statuses, in accordance with one or more embodiments. Data structure 400 may be a subset of a larger data structure. In some embodiments, data structure 400 may be a subset of data structure 300, as shown in FIG. 3, which has been updated with an updated status for <job_data_record_3>. Data structure 400 may include a job data record 403 and a status 406. In some embodiments, a container may have updated status 406 to indicate a completed status in response to the container completing the execution of the job execution code for the job.

In some embodiments, in response to the container successfully synchronizing the record instance of the job data record to the database, container management subsystem 114 may cause the container to determine that the job execution code failed to execute for the job associated with the job data record. For example, the job execution code may fail to execute for a job if the job has bad data, if the container cannot connect to the database, or for some other reason. In some embodiments, container management subsystem 114 may cause the container to update the job data record at the database by synchronizing an updated record instance of the job data record to the database. The updated record instance may be updated to include a job failed status for the status data field of the job data record.

Returning to FIG. 4, data structure 450 may be a subset of a larger data structure. In some embodiments, data structure 400 may be a subset of data structure 300, as shown in FIG. 3, which has been updated with an updated status for <job_data_record_3>. Data structure 400 may include a job data record 453 and a status 456. In some embodiments, a container may have updated status 456 to indicate a failed status in response to the container failing to execute the job execution code for the job.

In response to the container successfully synchronizing the record instance of the job data record to the database, container management subsystem 114 may cause the container to attempt to execute the job execution code for the job associated with the job data record. Container management subsystem 114 may cause the container to determine that the job execution code for the job associated with the job data record has failed. For example, the job execution code may fail to execute for a job if the job has bad data, if the container cannot connect to the database, or for some other reason. Container management subsystem 114 may cause the container to update the job data record at the database by synchronizing an updated record instance of the job data record to the database. In some embodiments, the updated record instance may be updated to include a retry status for the status data field of the job data record. The retry status may indicate that previous processing attempts have failed but that additional attempts are required. For example, distributed job execution system 102 may require a certain number of retry attempts of each job having a failed execution of the code. In some embodiments, the retry status may be utilized when distributed job execution system 102 determines that the code execution may have failed due to a temporary issue, such as a temporary inability to connect to a database.

In some embodiments, a retry status may enable a maximum number of attempts for the container or other containers. The maximum number of attempts may be a default number or may depend on a reason for failure of the code execution or other factors. A retry attempt may follow a process that is the same as or similar to an initial attempt. For example, in response to determining that the maximum number of attempts has not been reached, container management subsystem 114 may cause the container to update the status data field of the record instance of the job data record from the retry status to the job-in-progress status. The container management subsystem 114 may then cause the container to attempt to update the job data record at the database by attempting to synchronize the record instance of the job data record to the database. In some embodiments, in response to determining that the maximum number of retry attempts has not been reached, container management subsystem 114 may cause other containers of the plurality of distributed containers to update the status data field of the record instance of the job data record from the retry status to the job-in-progress status and attempt to update the job data record at the database by attempting to synchronize the record instance of the job data record to the database. Returning to FIG. 2, job manager 206 may cause, at step 218, container 209, container 212, or another container to retry jobs having failed execution of the job execution code.

FIG. 5 illustrates a data structure 500 storing job data record retry attempts, in accordance with one or more embodiments. Data structure 500 may be a subset of a larger data structure. Data structure 500 may be a subset of data structure 300, as shown in FIG. 3. Data structure 500 may include a job data record 503, a status 506, and a number of attempts 509. In some embodiments, attempts 509 may track how many retry attempts have been made for job data record 503. Each time a container fails to execute the code for the job associated with job data record 503, attempts 509 may increase by one. In some embodiments, attempts 509 may be compared to a maximum number of attempts. If attempts 509 is less than the maximum number of attempts, a container may attempt to process a job associated with job data record 503. If attempts 509 is equal to the maximum number of attempts, containers may not attempt to process the job associated with job data record 503. In some embodiments, once attempts 509 reach the maximum number of attempts, data recording subsystem 116 may update status 506 to a failed status (e.g., "FAIL").

Computing Environment

Figure 6:
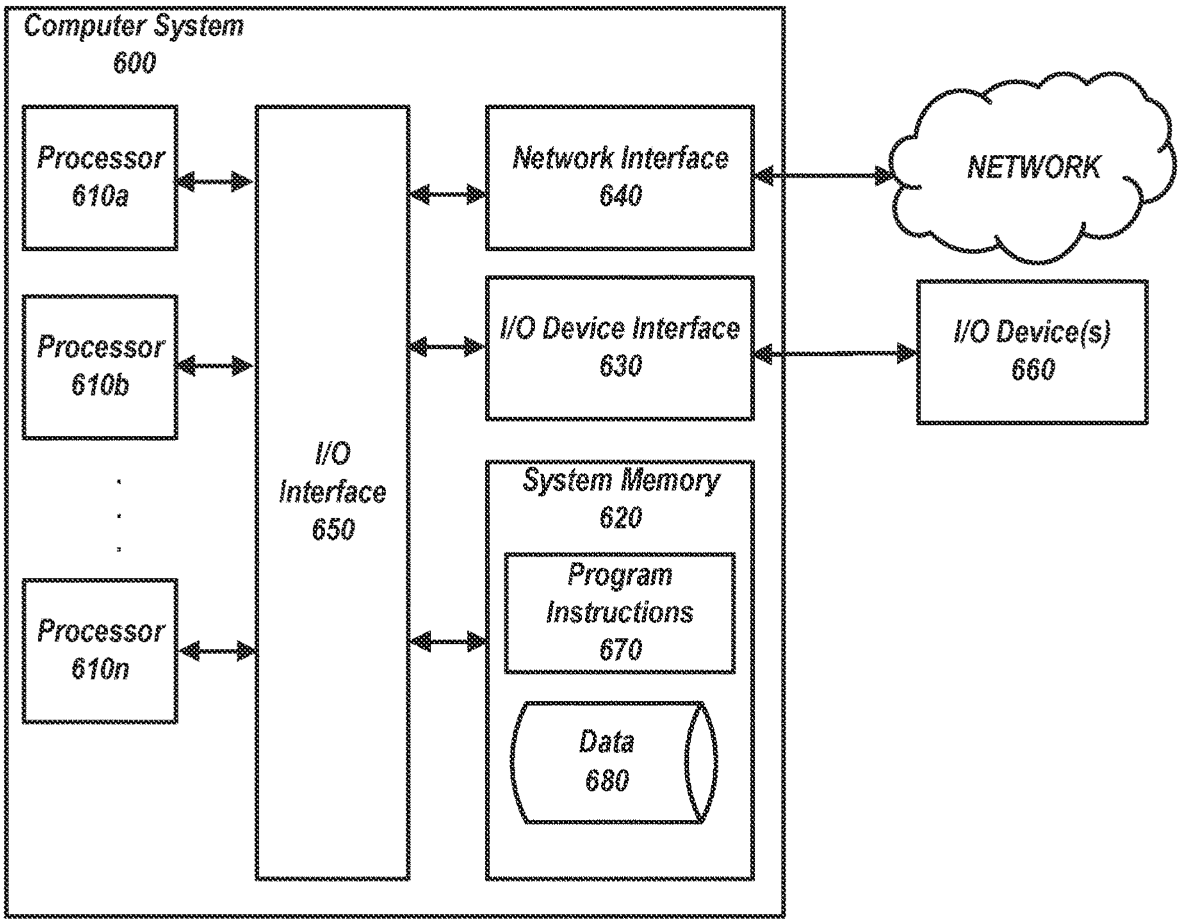
FIG. 6 illustrates a computing device, in accordance with one or more embodiments.

FIG. 6 shows an example computing system 600 that may be used in accordance with some embodiments of this disclosure. In some instances, computing system 600 is referred to as a computing system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof)

that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube or liquid crystal display monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
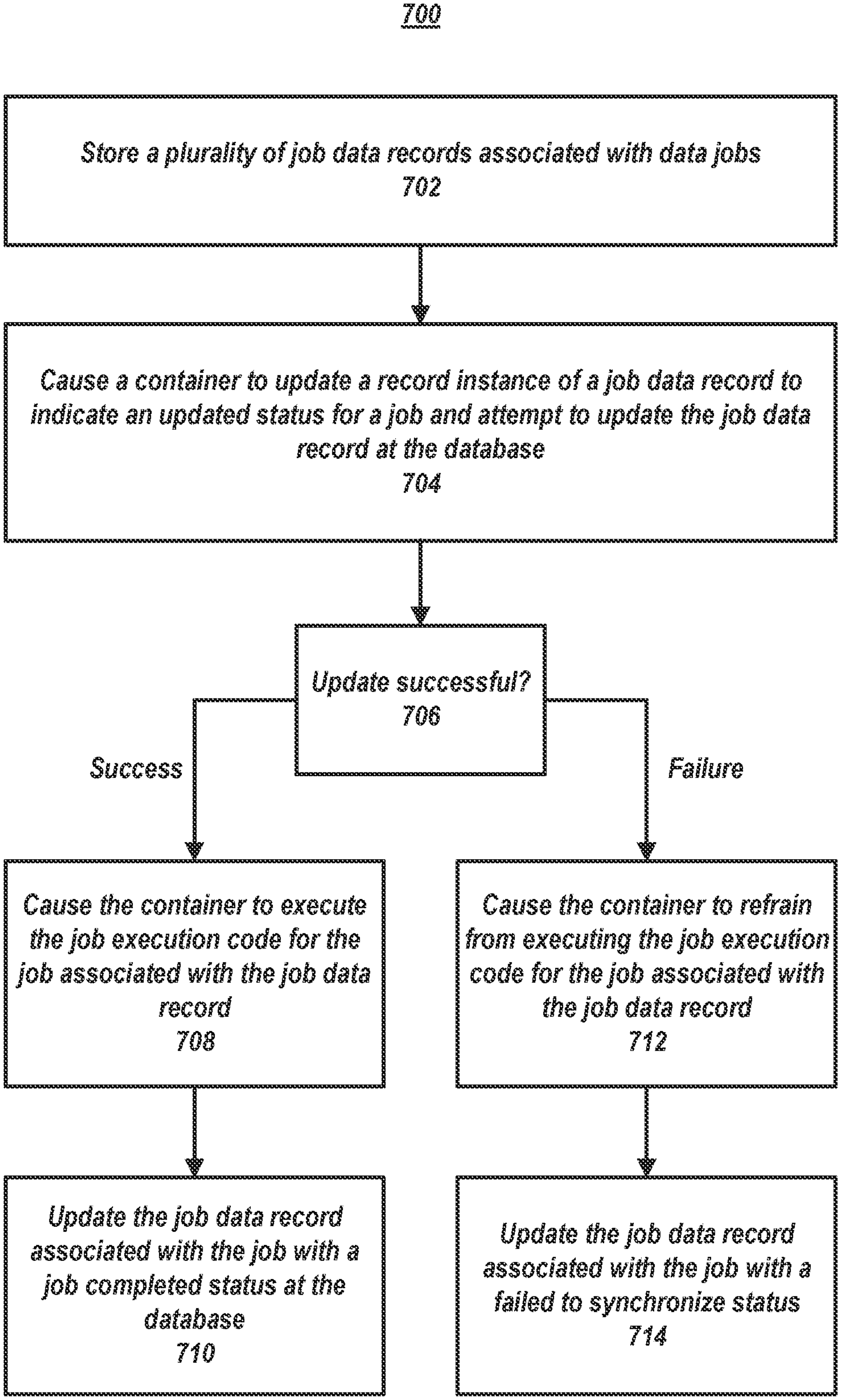
FIG. 7 shows a flowchart of the process for facilitating distributed job execution without a central job scheduler, in accordance with one or more embodiments.

FIG. 7 shows a flowchart of the process 700 for facilitating distributed job execution, in accordance with one or more embodiments. For example, the system may use process 700 (e.g., as implemented on one or more system components described above) in order to facilitate distributed job execution without a central job scheduler.

At 702, process 700 (e.g., using one or more of processors 610*a*-610*n*) stores a plurality of job data records associated with data jobs. For example, computing system 600 may receive the plurality of job data records via a network from I/O devices 660 or elsewhere. In some embodiments, the plurality of job data records may be received from one or more remote computing devices (e.g., I/O devices 660). In some embodiments, the plurality of job data records may be generated, for example, using one or more of processors 610*a*-610*n*. Each data record of the job data records may include a status data field indicating availability of a given job associated with the data record to be processed (e.g., by one or more of processors 610*a*-610*n*).

At 704, process 700 (e.g., using one or more of processors 610*a*-610*n*) causes a container to update a record instance of a job data record to indicate an updated status for a job and attempt to update the job data record at the database. For example, the container may update the record instance in system memory 620. The container may update the record instance to have a job-in-progress status. The container may then attempt to update the job data record at the database via the network. In some embodiments, attempting to update the job data record at the database may include attempting to synchronize the record instance of the job data record to the database.

At 706, process 700 (e.g., using one or more of processors 610*a*-610*n*) may proceed either to 708 or 712 based on whether the attempt to update the job data record at the database (e.g., by attempting to synchronize the record instance of the job data record to the database) succeeds. If the attempt succeeds, process 700 may proceed to 708. If the attempt fails, process 700 may proceed to 712.

Process 700 may proceed to 708 in response to the container successfully synchronizing the record instance of the job data record to the database. At 708, process 700 (e.g., using one or more of processors 610*a*-610*n*) causes the container to execute the job execution code for the job associated with the job data record. In some embodiments, the job execution code may be stored in system memory 620, data 680, or elsewhere in computing system 600.

At 710, process 700 (e.g., using one or more of processors 610*a*-610*n*) updates a first job data record associated with a first job at the database based on execution of the first job (e.g., at 708). For example, process 700 may update the first job data record at the database via the network. Process 700 may update the first job data record at the database by synchronizing an updated record instance of the first job data record to the database. In some embodiments, the updated record instance is updated to include a job completed status for the status data field of the first job data record.

Process 700 may proceed to 712 in response to the container failing to synchronize the record instance of the job data record to the database. At 712, process 700 (e.g., using one or more of processors 610*a*-610*n*) causes the container to refrain from executing the job execution code for the job associated with the job data record. At 714, process 700 (e.g., using one or more of processors 610*a*-610*n*) updates the first job data record based on process 700 refraining from executing the first job (e.g., at step 712). Process 700 may locally update the first job data record. For example, further in response to the container failing to synchronize the record instance of the job data record to the database, process 700 may update the status data field of the record instance of the job data record to have a failed-to-synchronize status.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising storing, in a database, a plurality of job data records associated with data jobs, each data record of the job data records indicating a status of a given job associated with the data record to be processed, deploying instructions that cause a container of a plurality of distributed containers to: prior to executing job execution code for a job associated with a job data record of the job data records, (i) update a record instance of the job data record to indicate an updated status for the job and (ii) attempt to update the job data record at the database based on the record instance of the job data record, in response to the container successfully updating the job data record at the database, execute the job execution code for the job associated with the job data record, and in response to the container failing to update the job data record at the database, refrain from executing the job execution code for the job associated with the job data record, and updating a first job data record associated with a first job at the database based on execution of the first job by a first container of the distributed containers.

2. The method of any one of the preceding embodiments, wherein deploying the instructions that cause the container to update the record instance of the job data record to indicate the updated status for the job further comprises: causing the container to update a status data field of a data structure of the job data record to have a job-in-progress status, and causing the container to attempt to synchronize the updated status data field of the data structure of the job data record with the database.
3. The method of any one of the preceding embodiments, wherein deploying the instructions that cause the container to update the record instance of the job data record to indicate the updated status for the job further comprises: causing the container to update a status data field of a data structure of the job data record to have a job-in-progress status, and causing the container to attempt to synchronize the updated data structure of the job data record with the database.
4. The method of any one of the preceding embodiments, wherein the instructions further cause the container to: in response to the container failing to synchronize the record instance of the job data record to the database: update a status data field of the record instance of the job data record to have a synchronization failed status, the status data field indicating availability of a given job associated with the data record to be processed, and prior to beginning execution of the job execution code for a new job associated with a new job data record of the job data records, (i) update a new status data field of a new record instance of the new job data record to have a job-in-progress status and (ii) attempt to update the new job data record at the database by attempting to synchronize the new record instance of the new job data record to the database.
5. The method of any one of the preceding embodiments, wherein the instructions further cause the container to: in response to the container successfully synchronizing the record instance of the job data record to the database, attempt to execute the job execution code for the job associated with the job data record, determine that the job execution code for the job associated with the job data record has failed, and update the job data record at the database by synchronizing an updated record instance of the job data record to the database, the updated record instance being updated to include a job failed status for a status data field of the job data record, the status data field indicating availability of a given job associated with the data record to be processed.
6. The method of any one of the preceding embodiments, wherein the instructions further cause the container to: in response to the container successfully synchronizing the record instance of the job data record to the database, attempt to execute the job execution code for the job associated with the job data record, determine that the job execution code for the job associated with the job data record has failed, update the job data record at the database by synchronizing an updated record instance of the job data record to the database, the updated record instance being updated to include a retry status for a status data field of the job data record, wherein the retry status enables a maximum number of attempts.
7. The method of any one of the preceding embodiments, wherein the instructions further cause the container to, in response to determining that the maximum number of attempts has not been reached, (i) update the status data field of the record instance of the job data record from the retry status to a job-in-progress status and (ii) attempt to update the job data record at the database by attempting to synchronize the record instance of the job data record to the database.
8. The method of any one of the preceding embodiments, further comprising deploying other instructions that cause other containers of the plurality of distributed containers to, in response to determining that the maximum number of attempts has not been reached, (i) update the status data field of the record instance of the job data record from the retry status to a job-in-progress status and (ii) attempt to update the job data record at the database by attempting to synchronize the record instance of the job data record to the database.
9. A tangible, non-transitory, machine-readable medium storing instructions that, when executed by a data processing apparatus, cause the data processing apparatus to perform operations comprising those of any of embodiments 1-8.
10. A system comprising one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:

1. A system for facilitating distributed job execution without a central job scheduler, the system comprising:

at least one processor, at least one memory, and computer-readable media having computer-executable instructions stored thereon, the computer-executable instructions, when executed by the at least one processor, causing the system to perform operations comprising:

generating and storing, in a database, a plurality of job data records associated with jobs, each data record of the job data records comprising a status data field indicating availability of a given job associated with the data record to be processed;

releasing the jobs to a plurality of distributed containers by enabling the distributed containers to access the job data records;

deploying preliminary execution code configured to cause a container of the distributed containers to:

prior to beginning execution of job execution code for a job associated with a job data record of the job data records, (i) update the status data field of a record instance of the job data record to have a job-in-progress status and (ii) attempt to update the job data record at the database by attempting to synchronize the record instance of the job data record to the database;

in response to the container successfully synchronizing the record instance of the job data record to the database, execute the job execution code for the job associated with the job data record; and in response to the container failing to synchronize the record instance of the job data record to the database, refrain from executing the job execution code for the job associated with the job data record; and in response to a given container of the distributed containers completing the execution of the job execution code for the job, updating the job data record at the database by synchronizing an updated record instance of the job data record to the database, the updated record instance being updated by the given container to include a job completed status for the status data field of the job data record.

2. The system of claim 1, wherein the preliminary execution code further causes the container of the distributed containers to:

in response to the container failing to synchronize the record instance of the job data record to the database: update the status data field of the record instance of the job data record to have a failed-to-synchronize status; and prior to beginning execution of the job execution code for a new job associated with a new job data record of the job data records, (i) update a new status data field of a new record instance of the new job data record to have the job-in-progress status and (ii) attempt to update the new job data record at the database by attempting to synchronize the new record instance of the new job data record to the database.

3. The system of claim 1, wherein the preliminary execution code further causes the container of the distributed containers to:

in response to the container successfully synchronizing the record instance of the job data record to the database, determine that the job execution code failed to execute for the job associated with the job data record; and update the job data record at the database by synchronizing an updated record instance of the job data record to the database, the updated record instance being updated to include a job failed status for the status data field of the job data record.

4. The system of claim 1, wherein the preliminary execution code further causes the container of the distributed containers to:

in response to the container successfully synchronizing the record instance of the job data record to the database, attempt to execute the job execution code for the job associated with the job data record;

determine that the job execution code for the job associated with the job data record has failed;

update the job data record at the database by synchronizing an updated record instance of the job data record to the database, the updated record instance being updated to include a retry status for the status data field of the job data record, wherein the retry status enables a maximum number of attempts for the container; and in response to determining that the maximum number of attempts has not been reached, (i) update the status data field of the record instance of the job data record from the retry status to the job-in-progress status and (ii) attempt to update the job data record at the database by attempting to synchronize the record instance of the job data record to the database.

5. A method comprising:

storing, in a database, a plurality of job data records associated with data jobs, each data record of the job data records indicating a status of a given job associated with the data record to be processed;

deploying instructions that cause a container of a plurality of distributed containers to:

prior to executing job execution code for a job associated with a job data record of the job data records, (i) update a record instance of the job data record to indicate an updated status for the job and (ii) attempt to update the job data record at the database based on the record instance of the job data record;

in response to the container successfully updating the job data record at the database, execute the job execution code for the job associated with the job data record; and in response to the container failing to update the job data record at the database, refrain from executing the job execution code for the job associated with the job data record; and updating a first job data record associated with a first job at the database based on execution of the first job by a first container of the distributed containers.

6. The method of claim 5, wherein deploying the instructions that cause the container to update the record instance of the job data record to indicate the updated status for the job further comprises:

causing the container to update a status data field of a data structure of the job data record to have a job-in-progress status; and causing the container to attempt to synchronize the updated status data field of the data structure of the job data record with the database.

7. The method of claim 5, wherein deploying the instructions that cause the container to update the record instance of the job data record to indicate the updated status for the job further comprises:

causing the container to update a status data field of a data structure of the job data record to have a job-in-progress status; and causing the container to attempt to synchronize the updated data structure of the job data record with the database.

8. The method of claim 5, wherein the instructions further cause the container to:

in response to the container failing to synchronize the record instance of the job data record to the database: update a status data field of the record instance of the job data record to have a synchronization failed status, the status data field indicating availability of a given job associated with the data record to be processed; and prior to beginning execution of the job execution code for a new job associated with a new job data record of the job data records, (i) update a new status data field of a new record instance of the new job data record to have a job-in-progress status and (ii) attempt to update the new job data record at the database by attempting to synchronize the new record instance of the new job data record to the database.

9. The method of claim 5, wherein the instructions further cause the container to:

in response to the container successfully synchronizing the record instance of the job data record to the database, attempt to execute the job execution code for the job associated with the job data record;

determine that the job execution code for the job associated with the job data record has failed; and update the job data record at the database by synchronizing an updated record instance of the job data record to the database, the updated record instance being updated to include a job failed status for a status data field of the job data record, the status data field indicating availability of a given job associated with the data record to be processed.

10. The method of claim 5, wherein the instructions further cause the container to:

in response to the container successfully synchronizing the record instance of the job data record to the database, attempt to execute the job execution code for the job associated with the job data record;

determine that the job execution code for the job associated with the job data record has failed; and update the job data record at the database by synchronizing an updated record instance of the job data record to the database, the updated record instance being updated to include a retry status for a status data field of the job data record, wherein the retry status enables a maximum number of attempts.

11. The method of claim 10, wherein the instructions further cause the container to, in response to determining that the maximum number of attempts has not been reached, (i) update the status data field of the record instance of the job data record from the retry status to a job-in-progress status and (ii) attempt to update the job data record at the database by attempting to synchronize the record instance of the job data record to the database.

12. The method of claim 10, further comprising deploying other instructions that cause other containers of the plurality of distributed containers to, in response to determining that the maximum number of attempts has not been reached, (i) update the status data field of the record instance of the job data record from the retry status to a job-in-progress status and (ii) attempt to update the job data record at the database by attempting to synchronize the record instance of the job data record to the database.

13. A non-transitory, computer-readable medium storing instructions that when executed by one or more processors cause the one or more processors to perform operations comprising:

storing, in a database, a plurality of job data records associated with jobs, each data record of the job data records indicating a status of a job associated with the data record to be processed;

causing each container of a plurality of containers to:

prior to execution of job execution code for a job associated with a job data record of the job data records, (i) update a record instance of the job data record to indicate an updated status for the job and (ii) attempt to update the job data record at the database based on the record instance of the job data record;

in response to the container successfully updating the job data record at the database, execute the job execution code for the job associated with the job data record; and in response to the container failing to update the job data record at the database, avoid the execution of the job associated with the job data record; and updating a first job data record associated with a first job at the database based on execution of the first job of the jobs by a first container of the containers.

14. The non-transitory, computer-readable medium of claim 13, wherein causing each container to update the record instance of the job data record to indicate the updated status for the job comprises:

causing each container to update a status data field of a data structure of the job data record to have a job-in-progress status; and causing each container to attempt to synchronize the updated status data field of the data structure of the job data record with the database.

15. The non-transitory, computer-readable medium of claim 13, wherein causing each container to update the record instance of the job data record to indicate the updated status for the job comprises:

causing each container to update a status data field of a data structure of the job data record to have a job-in-progress status; and causing each container to attempt to synchronize the updated data structure of the job data record with the database.

16. The non-transitory, computer-readable medium of claim 13, wherein the instructions cause the one or more processors to perform operations further comprising causing each container to, in response to the container failing to synchronize the record instance of the job data record to the database:

update a status data field of the record instance of the job data record to have a synchronization failed status, the status data field indicating availability of a given job associated with the data record to be processed; and prior to beginning execution of the job execution code for a new job associated with a new job data record of the job data records, (i) update a new status data field of a new record instance of the new job data record to have a job-in-progress status and (ii) attempt to update the new job data record at the database by attempting to synchronize the new record instance of the new job data record to the database.

17. The non-transitory, computer-readable medium of claim 13, wherein the instructions cause the one or more processors to perform operations further comprising causing each container to:

in response to the container successfully synchronizing the record instance of the job data record to the database, attempt to execute the job execution code for the job associated with the job data record;

determine that the job execution code for the job associated with the job data record has failed; and update the job data record at the database by synchronizing an updated record instance of the job data record to the database, the updated record instance being updated to include a job failed status for a status data field of the job data record, the status data field indicating availability of a given job associated with the data record to be processed.

18. The non-transitory, computer-readable medium of claim 13, wherein the instructions cause the one or more processors to perform operations further comprising causing each container to:

in response to the container successfully synchronizing the record instance of the job data record to the database, attempt to execute the job execution code for the job associated with the job data record;

determine that the job execution code for the job associated with the job data record has failed; and update the job data record at the database by synchronizing an updated record instance of the job data record to the database, the updated record instance being updated to include a retry status for a status data field of the job data record, wherein the retry status enables a maximum number of attempts.

19. The non-transitory, computer-readable medium of claim 18, wherein the instructions cause the one or more processors to perform operations further comprising causing a particular container of the plurality of containers to, in response to determining that the maximum number of attempts has not been reached, (i) update the status data field of the record instance of the job data record from the retry status to a job-in-progress status and (ii) attempt to update the job data record at the database by attempting to synchronize the record instance of the job data record to the database.

20. The non-transitory, computer-readable medium of claim 18, wherein the instructions cause the one or more processors to perform operations further comprising causing other containers of the plurality of containers to, in response to determining that the maximum number of attempts has not been reached, (i) update the status data field of the record instance of the job data record from the retry status to a job-in-progress status and (ii) attempt to update the job data record at the database by attempting to synchronize the record instance of the job data record to the database.

* * * * *